United States Patent
Venkitachalam et al.

(10) Patent No.: US 11,507,477 B2
(45) Date of Patent: *Nov. 22, 2022

(54) VIRTUAL MACHINE FAULT TOLERANCE

(71) Applicant: VMware, Inc., Palo Alto, CA (US)

(72) Inventors: Ganesh Venkitachalam, Mountain View, CA (US); Rohit Jain, Mountain View, CA (US); Boris Weissman, Palo Alto, CA (US); Daniel J. Scales, Mountain View, CA (US); Vyacheslav Vladimirovich Malyugin, Los Gatos, CA (US); Jeffrey W. Sheldon, Mountain View, CA (US); Min Xu, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 16/801,096

(22) Filed: Feb. 25, 2020

(65) Prior Publication Data
US 2020/0192771 A1 Jun. 18, 2020

Related U.S. Application Data

(63) Continuation of application No. 15/284,465, filed on Oct. 3, 2016, now Pat. No. 10,579,485, which is a
(Continued)

(51) Int. Cl.
*G06F 11/16* (2006.01)
*G06F 11/07* (2006.01)
(Continued)

(52) U.S. Cl.
CPC ...... *G06F 11/1658* (2013.01); *G06F 9/45533* (2013.01); *G06F 9/45558* (2013.01);
(Continued)

(58) Field of Classification Search
CPC .......... G06F 9/45533; G06F 11/0766; G06F 11/079; G06F 11/0712; G06F 2009/45579
See application file for complete search history.

(56) References Cited

U.S. PATENT DOCUMENTS 5,488,716 A 1/1996 Schneider et al.
6,421,739 B1 7/2002 Holiday
(Continued)

OTHER PUBLICATIONS

Cully et al., "Remus: High Availability via asynchronous virtual machine replication", Proc. of the 5th USENIX Symposium on networked systems design and implementation, 2008 (Year: 2008).*
(Continued)

*Primary Examiner* — Lewis A Bullock, Jr.
*Assistant Examiner* — Kevin X Lu
(74) *Attorney, Agent, or Firm* — Loza & Loza, LLP

(57) ABSTRACT

System and method for providing fault tolerance in virtualized computer systems use a first guest and a second guest running on virtualization software to produce outputs, which are produced when a workload is executed on the first and second guests. An output of the second guest is compared with an output of the first guest to determine if there is an output match. If there is no output match, the first guest is paused and a resynchronization of the second guest is executed to restore a checkpointed state of the first guest on the second guest. After the resynchronization of the second guest, the paused first guest is caused to resume operation.

20 Claims, 10 Drawing Sheets

Related U.S. Application Data continuation of application No. 13/471,616, filed on May 15, 2012, now Pat. No. 9,459,895, which is a continuation of application No. 12/484,640, filed on Jun. 15, 2009, now Pat. No. 8,201,169.

(51) Int. Cl.
*G06F 9/455* (2018.01)
*G06F 9/48* (2006.01)

(52) U.S. Cl.
CPC .......... *G06F 9/4881* (2013.01); *G06F 11/079* (2013.01); *G06F 11/0712* (2013.01); *G06F 11/0766* (2013.01); *G06F 2009/45579* (2013.01); *G06F 2009/45591* (2013.01); *G06F 2201/805* (2013.01); *G06F 2201/815* (2013.01); *G06F 2201/82* (2013.01)

(56) References Cited

U.S. PATENT DOCUMENTS

| | | | |
|---|---|---|---|
| 6,625,751 B1 | 9/2003 | Starovic et al. | |
| 6,795,966 B1 * | 9/2004 | Lim | G06F 11/1438 718/1 |
| 6,832,367 B1 | 12/2004 | Choi et al. | |
| 7,039,827 B2 | 5/2006 | Meyer et al. | |
| 7,308,607 B2 | 12/2007 | Reinhardt et al. | |
| 7,536,587 B2 * | 5/2009 | Vertes | G06F 11/1438 714/13 |
| 7,770,064 B2 | 8/2010 | Harper et al. | |
| 7,797,682 B2 | 9/2010 | Stocker | |
| 7,865,893 B1 * | 1/2011 | Omelyanchuk | G06F 9/45558 718/1 |
| 7,975,173 B2 | 7/2011 | Callaway et al. | |
| 3,020,041 A1 | 9/2011 | Huang et al. | |
| 2008/0244535 A1 | 10/2008 | Nelson et al. | |
| 2009/0070761 A1 | 3/2009 | Zhao | |
| 2009/0089879 A1 | 4/2009 | Wang et al. | |
| 2009/0106328 A1 * | 4/2009 | Callaway | G06F 11/2097 |
| 2009/0119538 A1 | 5/2009 | Scales et al. | |
| 2009/0119665 A1 * | 5/2009 | Venkitachalam | G06F 11/2038 718/1 |
| 2009/0249049 A1 | 10/2009 | Weissman et al. | |
| 2010/0318991 A1 | 12/2010 | Venkitachalam et al. | |
| 2014/0082619 A1 | 3/2014 | Yoshida et al. | |
| 2015/0205688 A1 | 7/2015 | Haid et al. | |
| 2016/0110127 A1 | 4/2016 | Qiao et al. | |

OTHER PUBLICATIONS

Dunlap et al.; "ReVirt: Enabling Intrusion Analysis through Virtual-Machine Logging and Replay"; Winter 2002, Proceedings of the 2002 Symposiumon Operating System Design and Implementation.

Cully et al.; "Remus: High Availability via Asynchronous Virtual Machine Replication"; 2008, Proceedings of the 5th USNEX Symposium on Networked Systems Design and Implementation.

Bressoud et al.; "Hypervisor-Based Fault Tolerance"; SIGOPS '95, Dec. 1995; pp. 1-11.

* cited by examiner

VIRTUAL MACHINE FAULT TOLERANCE

CROSS REFERENCE TO RELATED APPLICATIONS

This application is a continuation of U.S. patent application Ser. No. 15/284,465, filed on Oct. 3, 2016, issued as U.S. Pat. No. 10,579,485, which is a continuation of U.S. patent application Ser. No. 13/471,616, filed on May 15, 2012, issued as U.S. Pat. No. 9,459,895, which is a continuation of U.S. patent application Ser. No. 12/484,640, filed on Jun. 15, 2009, issued as U.S. Pat. No. 8,201,169, all of which are incorporated herein by reference.

CROSS REFERENCE TO RELATED APPLICATIONS

This application is a continuation of U.S. patent application Ser. No. 12/484,640 filed on Jun. 15, 2009, entitled "Virtual Machine Fault Tolerance."

BACKGROUND

Conventional fault tolerance (FT) systems are typically based on lockstep execution of redundant hardware. That is, custom hardware ensures that a primary machine and a secondary machine are synchronized by driving the same clock signal to CPUs and Input/Output (I/O) subsystems of both the primary machine and the secondary machine; given the same initial state, and fully deterministic CPUs, two machines driven by the same clock signal remain in lockstep. Similarly, motherboards and chipsets are kept in lockstep by using a single system clock source. Custom logic is often used to compare I/O outputs of all motherboards, and initiate corrective actions such as failover on output mismatch.

Virtual machine technology has become widely recognized, and as is well known, a virtualized computer system is often provided with FT capabilities so the virtualized computer system may continue to operate properly in the event of a failure of one of the virtual machines (VMs) running thereon. However, FT in virtualized computer systems has specific requirements that make hardware-based fault tolerance less convenient. First, a VM rather than a primary machine is a primary unit of management in a virtualized computer system. In particular, while some VMs running on a host computer might need FT, other VMs might not. Although it is not uncommon to aggregate many VMs on the same host computer, the number of VMs with FT requirements is generally small relative to the total number of VMs running on the same host computer. Thus, it is inefficient to use customized hardware to provide FT when some VMs running on the host computer do not need FT.

Second, virtualized workloads are mobile. For example, techniques exist to migrate VMs across host computer systems. In such environments, individual host computer systems are treated as members of a larger resource pool. As such, the use of custom FT hardware is inconsistent with an individual host computer's being a member of a larger resource pool.

Third, in some virtualized computer systems, guest operating systems operate under an illusion of utilizing the same virtual hardware, regardless of the underlying physical hardware. This improves VM mobility, and speeds up hardware upgrade cycles since the VMs are generally unaware of upgrades to the physical hardware of the host computer system. Some conventional, hardware-based FT systems use modified kernel drivers to shield a guest operating system in a VM from detected hardware failures. However, in such systems, the guest operating system is generally aware of the special nature of FT hardware, even though this is inconsistent with a guest operating system's illusion of utilizing the same virtual hardware.

In addition to the above-identified issues involved with providing FT in virtualized computer systems, full host lockstep execution to provide FT is becoming increasingly difficult to achieve due to increases in CPU speed. In addition, CPUs might be internally non-deterministic, and I/O based on a newer PCI-Express interface may be less synchronous than that based on an older PCI interface, thereby making hardware-based FT less reliable. Further, custom hardware used for FT is more expensive than commodity hardware.

SUMMARY

System and method for providing fault tolerance in virtualized computer systems use a first guest and a second guest running on virtualization software to produce outputs, which are produced when a workload is executed on the first and second guests. An output of the second guest is compared with an output of the first guest to determine if there is an output match. If there is no output match, the first guest is paused and a resynchronization of the second guest is executed to restore a checkpointed state of the first guest on the second guest. After the resynchronization of the second guest, the paused first guest is caused to resume operation.

DETAILED DESCRIPTION

Figure 1:
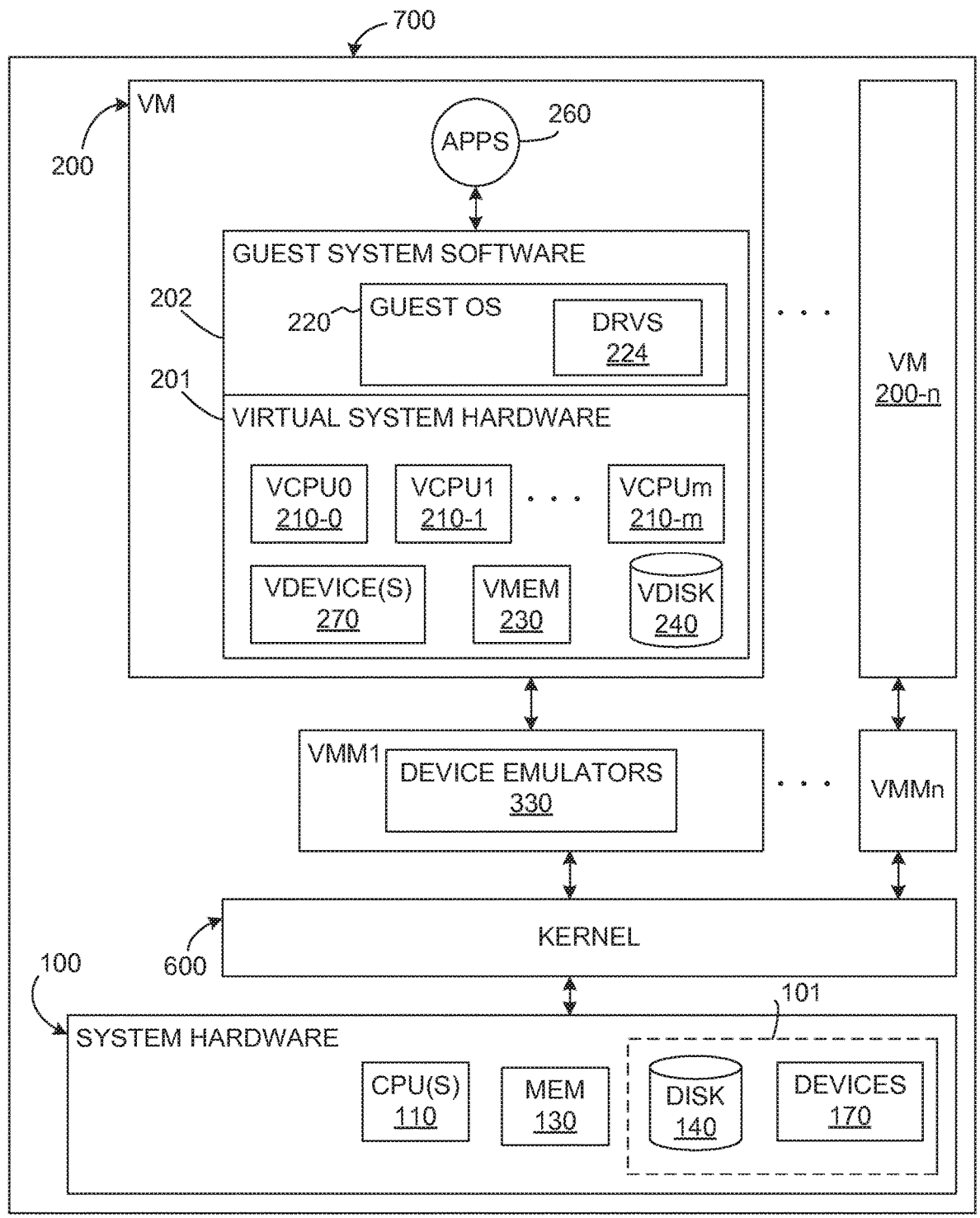
FIG. 1 illustrates a non-hosted virtualized system in the prior art.
Figure 2:
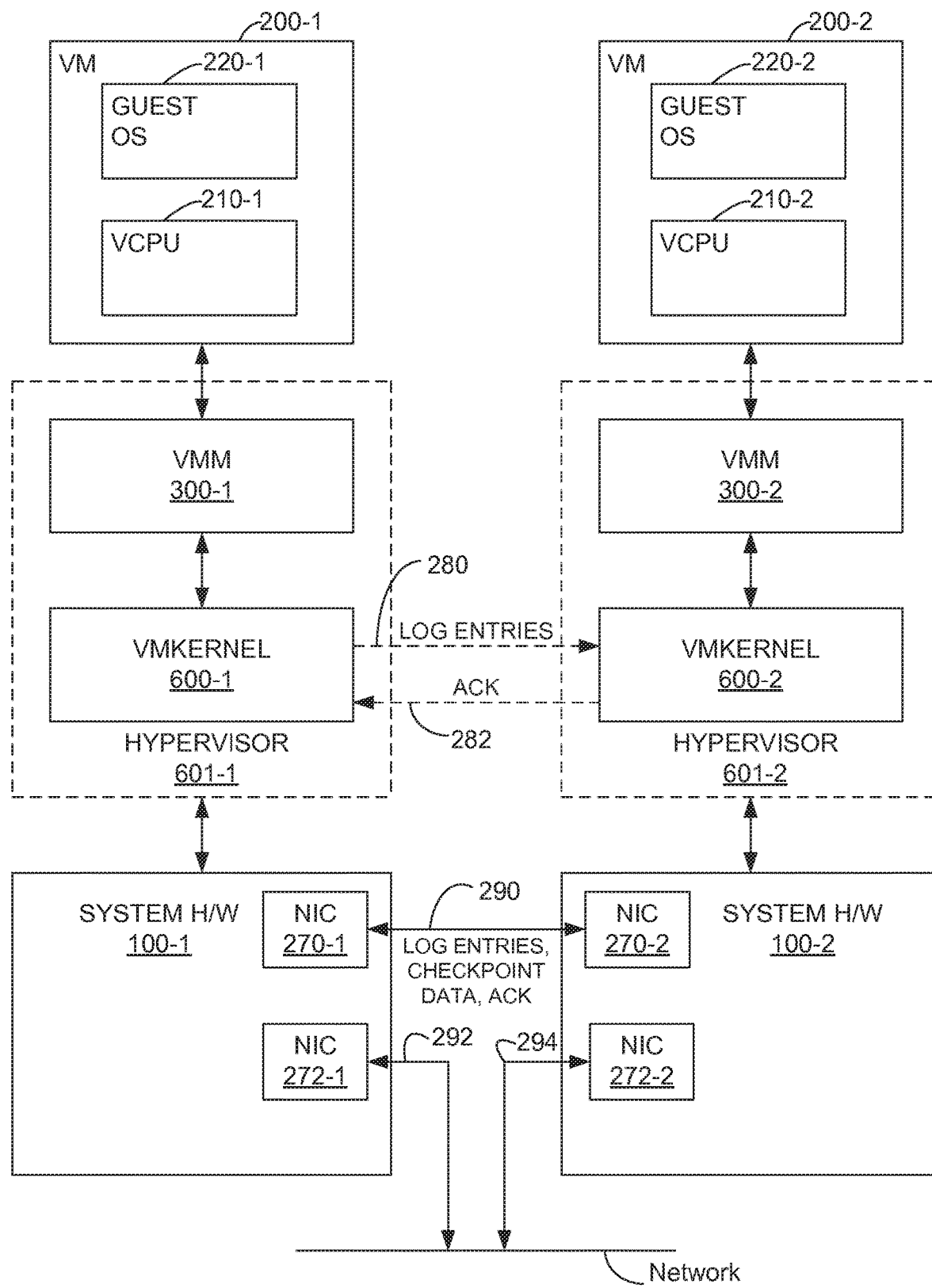
FIG. 2 illustrates a computer system providing fault tolerance (FT) in accordance with one or more embodiments of the present invention wherein a primary virtual machine (VM) is supported by a secondary (or backup) VM.

A non-hosted virtualized computer system is described in the Appendix in conjunction with FIG. 1. FIG. 2 illustrates a computer system providing fault tolerance (FT) in accordance with one or more embodiments of the present invention, which computer system includes a primary virtualized computer system ("VCS") and a secondary VCS. As shown in FIG. 2, a primary virtual machine (VM) (i.e., VM 200-1) running on the primary VCS (having system hardware, i.e., system H/W 100-1) is supported by a secondary (or backup) VM (i.e., VM 200-2) running on the secondary VCS system (having system hardware, i.e., system H/W 100-2). Primary VM 200-1 is a "real" VM in that it is communicating externally of the primary VCS on which it is operating, and secondary VM 200-2 is configured to take over almost instantaneously if the primary VCS or primary VM 200-1 fails. By comparison with primary VM 200-1, secondary VM 200-2 is "not real" (i.e., it is a "shadow" VM) in the sense that it is not communicating externally of the secondary VCS on which it is operating until it takes over.

In accordance with one or more embodiments of the present invention, in a VCS running at least a primary VM on virtualization software in a primary VCS and running a secondary (or backup) VM on virtualization software in a secondary VCS, a computer-implemented method for the secondary VM to provide quasi-lockstep fault tolerance for the primary VM comprises: comparing output generated by predetermined virtualized devices of the primary VM and the secondary VM before such output from the primary VM is made externally visible from the primary VCS while not making such output from the secondary VM externally visible from the secondary VCS; determining the primary and secondary VMs to be in quasi-lockstep as long as the primary and secondary VMs generate identical outputs; and if they are not in quasi-lockstep, performing a checkpoint resynchronization. The term "quasi-lockstep means that the primary and secondary VMs are considered to be operating normally even when they might not be in lockstep and may actually diverge, for example and without limitation, in virtual CPU state, register(s), memory and I/O device states.

As shown in FIG. 2, primary VM 200-1 runs a guest operating system (guest OS 220-1) and a virtual CPU (VCPU 210-1) with virtualization software (hypervisor 601-1, where hypervisor 601-1 includes a virtual machine monitor (VMM 300-1) and VMKernel 600-1) on primary VCS hardware (i.e., system H/W 100-1) as explained below in the Appendix in conjunction with FIG. 1. As further shown in FIG. 2, secondary VM 200-2 runs guest OS 220-2 and VCPU 210-2 with virtualization software (hypervisor 601-2, where hypervisor 601-2 includes VMM 300-2 and VMKernel 600-2) on secondary VCS hardware (i.e., system H/W 100-2) as explained below in the Appendix in conjunction with FIG. 1. As further shown in FIG. 2, network interface cards (NICs 272-1 and 272-2) communicate network packets via physical network 274, and NICs 270-1 and 270-2 communicate packets via physical network 290, where, in accordance with one or more preferred embodiments, network 290 may be a private network, i.e., a network utilized for particular communications.

In accordance with one or more embodiments of the present invention, as primary VM 200-1 executes a workload (the workload comprises a set of instructions to carry out one or more processes), virtualization software, for example, software in VMkernel 600-1, of the primary VCS: (a) causes all or predetermined externally visible events (for example, I/O events) to be recorded in an event log (for example, and without limitation, the event log (not shown) may be on disk storage) as log entries 280; and (b) sends log entries 280 to virtualization software, for example, software in VMkernel 600-2, of the secondary VCS. As shown in FIG. 2, the step of sending log entries 280 is indicated "logically" by a dotted line labeled log entries. However, in accordance with one or more embodiments of the present invention, log entries 280 are sent over communications network 290.

In accordance with one or more such embodiments of the present invention, secondary VM 200-2 replays the workload, and virtualization software, for example, software in VMKernel 600-2, of the secondary VCS: (a) sends acknowledgements 282 back to the virtualization software in the primary VCS, for example, software in VMkernel 600-1, indicating that data corresponding to a log event has been received; and (b) sends acknowledgements 282 indicating that the same data for a corresponding externally visible event was found for secondary VM 200-2. As shown in FIG. 2, the step of sending acknowledgements 282 is indicated "logically" by a dotted line labeled ACK. However, in accordance with one or more embodiments of the present invention, acknowledgments 282 and checksum data (explained below) are sent over communications network 290.

Fault Tolerance (FT) without Fully Deterministic Lockstep Operation

Figure 3A:
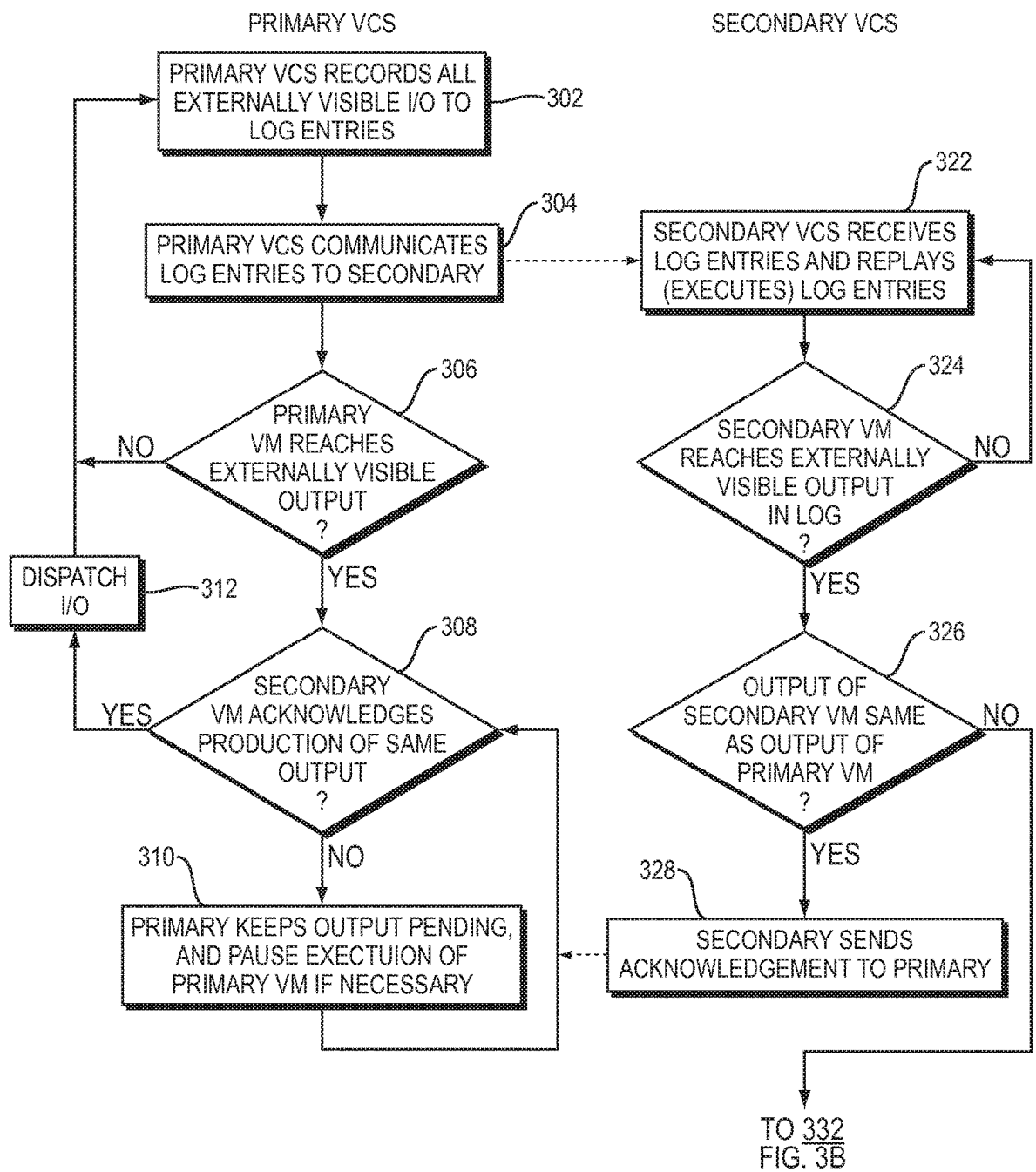
FIGS. 3A and 3B show flowcharts of a method of providing FT in accordance with one or more embodiments of the present invention wherein a primary VM is supported by a secondary (or backup) VM without fully deterministic lockstep ("quasi-lockstep") operation between the primary and secondary VMs.
Figure 3B:
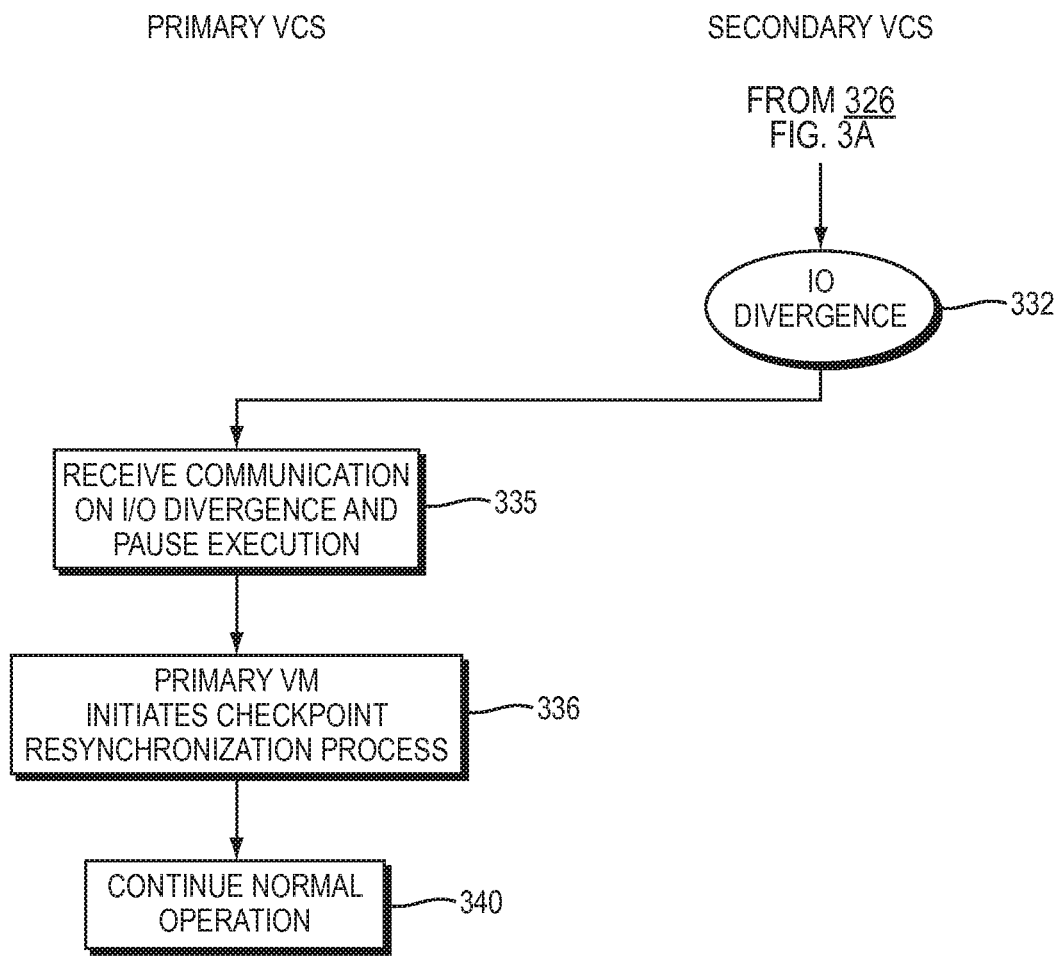

FIGS. 3A and 3B show flowcharts of a method of providing FT in accordance with one or more embodiments of the present invention wherein a primary VM is supported by a secondary (or backup) VM without fully deterministic lockstep ("quasi-lockstep") operation between the primary and secondary VMs. To provide VM fault tolerance, secondary (or backup) VM 200-2 should be in a state that enables it to take over from primary VM 200-1 whenever primary VM 200-1 produces an externally visible event such as, for example and without limitation, outputting network packets from the primary VCS. In accordance with one or more such embodiments of the present invention, the methods of FIGS. 3A and 3B require neither full host lockstep execution (where full host lockstep execution means the hardware eventually executes the same instruction at the same time) nor full guest lockstep execution (where full guest lockstep execution means the guest eventually executes the same instruction), i.e., quasi-lockstep execution. Advantageously, this enables the use of commodity hardware. Thus, the inventors have discovered that, while keeping primary VM 200-1 and secondary VM 200-2 in lockstep execution may be desirable to improve the performance of VM FT, it is not required.

Specifically, at step 302 of FIG. 3A, primary VM 200-1 in FIG. 2 sends a request to a virtual I/O device that can generate an externally visible I/O event. Examples of I/O devices that can generate externally visible I/O events include, for example and without limitation, virtual NICs, virtual graphics cards, virtual serial/parallel ports, virtual disk controllers, etc. In accordance with one or more embodiments of the present invention, device emulators in the virtualization software (for example VMM 300-1 in FIG. 2) of the primary VCS recognize such events. In response, the device emulators cause the virtualization software (for example, software in VMkernel 600-1 in FIG. 2) in the primary VCS to: (a) cause a log entry (for example, log entry 280 in FIG. 2) to be recorded in an event log; and (b) keep physical output associated with the event pending until it is acknowledged by virtualization software in the secondary VCS that secondary VM 200-2 would have produced the same output for the same externally visible I/O event. Then, control is transferred to step 304.

At step 304 of FIG. 3A, the virtualization software (for example, software in VMkernel 600-1) in the primary VCS causes the log entry to be transmitted to the secondary VCS. Then, control in the primary VCS transfers to decision step 306, and control in the secondary VCS transfers to step 322.

At step 322 of FIG. 3A, virtualization software (for example, VMkernel 600-2 in FIG. 2) in the secondary VCS receives the log entry (in log entries 280 in FIG. 2). Secondary VM 200-2 in FIG. 2 continues to execute (i.e., replays the workload) until the virtualization software (for example, the device emulators in VMM 300-2 in FIG. 2) encounters an externally visible I/O event. Control is then transferred to decision step 324.

At decision step 324 of FIG. 3A, the virtualization software (for example, VMkernel 600-2 in FIG. 2) in the secondary VCS searches log entries sent from the primary VCS to determine whether a log entry corresponding to the same event was sent from the primary VCS. If the externally visible I/O event in the secondary VCS has occurred before the matching log entry was received from the primary VCS, the virtualization software in the secondary VCS waits for a predetermined time-out period. If the time-out period expires, this may be indicated as a non-synchronization event. However, when the matching log entry is discovered, control is transferred to decision step 326.

At decision step 326 of FIG. 3A, virtualization software (for example, VMkernel 600-2 in FIG. 2) in the secondary VCS compares data associated with the externally visible I/O event produced by secondary VM 200-2 with that of primary VM 200-1. Note that the comparison is only on the content of the data, and not on the timing of the events. If the data for the externally visible I/O event of primary VM 200-1 matches that of secondary VM 200-2 within a predetermined (bounded) amount of time (time-out period above), control is transferred to step 328, otherwise, control is transferred to step 332 of FIG. 3B.

At step 328 of FIG. 3A, the virtualization software (for example, VMkernel 600-2) in the secondary VCS transmits an acknowledgement to the primary VCS. In accordance with one or more such embodiments, the externally visible output of secondary VM 200-2 is not promoted to a physical output, i.e., it is dropped. Alternatively, only the secondary VCS produces the physical output so that the overall latency of an externally visible I/O event is reduced by the latency of sending an acknowledgement of the data match to the primary VCS.

At decision step 306 of FIG. 3A, virtualization software (for example, VMkernel 600-1) in the primary VCS determines whether externally visible I/O events are pending. If so, control is transferred to decision step 308, otherwise, control is transferred to step 302.

At decision step 308 of FIG. 3A, virtualization software (for example, VMkernel 600-1) in the primary VCS determines whether the secondary acknowledged its generation of the same data for the same externally visible I/O event. If so, control is transferred to step 312, otherwise, control is transferred to step 310.

At step 312 of FIG. 3A, the virtualization software (for example, VMkernel 600-1) in the primary VCS dispatches the physical output externally. Control is then transferred to step 302.

At step 310 of FIG. 3A, the externally visible I/O event remains pending, and execution of primary VM 200-1 is paused if necessary. For example, primary VM 200-1 may wait for completions from secondary VM 200-2 with a timeout. If the timeout is exceeded, primary VM 200-1 can initiate resynchronization. Control is then transferred to step 308.

The following discusses first and second embodiments when the device is a virtual disk. In accordance with one or more embodiments of the present invention, for the first embodiment, all virtual disks (refer to VDISKS 240 shown in FIG. 1) are considered to be external to the VM and shared. In accordance with one or more such embodiments, all outputs to the virtual disks are verified (i.e., to be the same in the manner described above), and the secondary VM does not output to its virtual disk (assuming that the virtual disks are shared). This means that virtual disks of primary VM 300-1 and secondary VM 200-2 will not diverge (i.e., they will have the same contents) because the same outputs are provided to the virtual disks. As such, the virtual disks of primary VM 200-1 and secondary VM 200-2 do not need to be "synchronized" if an output divergence happens. However, to have the same effect if the virtual disk storage is not shared, secondary VM 200-2 should output to its virtual disk.

In accordance with one or more alternative or second embodiments, all virtual disks are considered to be internal to the VM (as a result secondary VM 200-2 will write to its virtual disks). In accordance with one or more such embodiments, outputs to the virtual disks are not verified. This means that primary VM 200-1 and secondary VM 200-2 can potentially run longer without running into an "output divergence" that requires resynchronizing the VMs. However, when secondary VM 200-2 does need to be resynchronized with primary VM 200-1, the virtual disks will need to be resynchronized as well. To make resynchronizing of virtual disks quicker, in accordance with one or more such alternative embodiments, disk block changes may be tracked in virtual disks of primary VM 200-1 so that virtual disks of secondary VM 200-2 may be synchronized by sending over disk blocks that have changed on primary VM 200-1 since the last synchronization point.

Output Divergence

At step 332 of FIG. 3B (since secondary VM 200-2 is not guaranteed to execute the same instruction stream in lock-step as primary VM 200-1, externally visible output produced by secondary VM 200-2 may eventually diverge from externally visible output produced by primary VM 200-1, for example, in the sense that I/O data for an event from secondary VM 200-2 is not the same as the I/O data for the event from primary VM 200-1 within a predetermined amount of time, thereby resulting in an output comparison failure), in accordance with one or more embodiments, the virtualization software (for example, VMkernel 600-2) in the secondary VCS sends a message to the primary VCS that an output I/O divergence has occurred. Control is then transferred to step 335.

At step 335 of FIG. 3B, when the primary VCS receives a communication relating to an output divergence from the secondary VCS, the primary VCS pauses primary VM 200-1. Control is then transferred to step 336 of FIG. 3B.

At step 336 of FIG. 3B, the primary VCS initiates a checkpoint resynchronization operation. In accordance with one or more embodiments of the present invention, checkpoint resynchronization (in accordance with one or more methods that are well known to those of ordinary skill in the art) involves serializing and storing an emulation state of a VM in a serialized file, sending that serialized file to another VM, and restoring the execution of the checkpointed VM on the other VM so that the other VM becomes synchronized with the checkpointed VM. Thus, secondary VM 200-2 completes the checkpoint resynchronization operation so that secondary VM 200-2 restores the checkpointed state of primary VM 200-1 and becomes synchronized with the state of primary VM 200-1. This is done with assistance from primary VM 200-1, for example, by primary VM 200-1 pausing its progress, or preventing its checkpointed state from being overwritten before secondary VM 200-2 restores the checkpointed state of primary VM 200-1. One example of a method of checkpointing the state of primary VM 200-1 and restoring the checkpointed state of primary VM 200-1 on secondary VM 200-2 is illustrated in U.S. Pat. No. 6,795,966 issued on Sep. 21, 2004 to Lim et al., which is incorporated by reference herein in its entirety. The checkpoint data may be forwarded from primary VM 200-1 to secondary VM 200-2 using the same network connection 290 (refer to FIG. 2) used to send log entries 280 from primary VM 200-1 to secondary VM 200-2. Control is then transferred to step 340.

At step 340 of FIG. 3B, primary VM 200-1 then continues normal operation.

Primary VM Fault

Figure 4A:
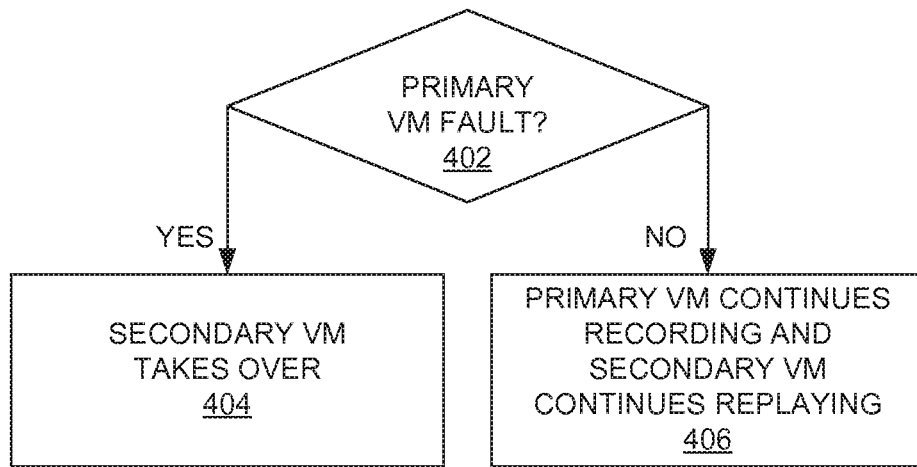
FIG. 4A shows a flowchart of a method of providing FT in case of a primary VM fault in accordance with one or more embodiments of the present invention.

FIG. 4A shows a flowchart of a method of providing FT in case of a primary VM fault in accordance with one or more embodiments of the present invention. At decision step 402 of FIG. 4A, the virtualization software in the primary VCS determines whether primary VM 200-1 fails. This determination may be done using any one of a number of heartbeating mechanisms that are well known to those of ordinary skill in the art. If so, control is transferred to step 404, otherwise, control is transferred to step 406.

At step 404 of FIG. 4A, the virtualization software in the primary VCS sends a message to the virtualization software in the secondary VCS, and the virtualization software in the secondary VCS causes secondary VM 200-2 to take over (i.e., it is promoted to being the primary VM). In particular, this means that physical outputs of primary VM 200-1 are released externally by the secondary VM 200-2. As one can readily appreciate, secondary VM 200-2 might not be in exactly the same state primary VM 200-1 was in just prior to primary VM 200-1 experiencing the fault. However, according to the embodiments illustrated by the flowcharts of FIGS. 3A and 3B, primary VM 200-1 and secondary VM 200-2 were in equivalent states at the time of the last externally visible I/O, and secondary VM 200-2 remains compatible with the last externally visible I/O prior to the fault. Therefore, no external entity can detect the fault in primary VM 200-1 or the switchover to secondary VM 200-2. Then, in accordance with one or more further embodiments of the present invention, when secondary VM 200-2 takes over and becomes the primary VM, a new secondary VM could be created and synchronized with the new primary VM to provide FT. In addition, in accordance with one or more further such embodiments, if the primary VCS is unavailable due, for example and without limitation, to hardware failure, failover where secondary VM 200-2 takes over may occur whenever secondary VM 200-2 detects a failure of primary VM 200-1 using, for example, a heartbeating mechanism in accordance with any one of a number of methods that are well known to those of ordinary skill in the art. In further addition, in accordance with one or more still further embodiments, for some partial hardware failures that cause VM problems, primary VM 200-1 will be able to indicate such a condition to the primary VCS which, in response, will send a message to the virtualization software in the secondary VCS so that the virtualization software in the secondary VCS will cause secondary VM 200-2 to take over.

At step 406 of FIG. 4A, primary VM 200-1 continues operation and recording, and secondary VM 200-2 continues replaying the workload.

Secondary VM Fault

Figure 4B:
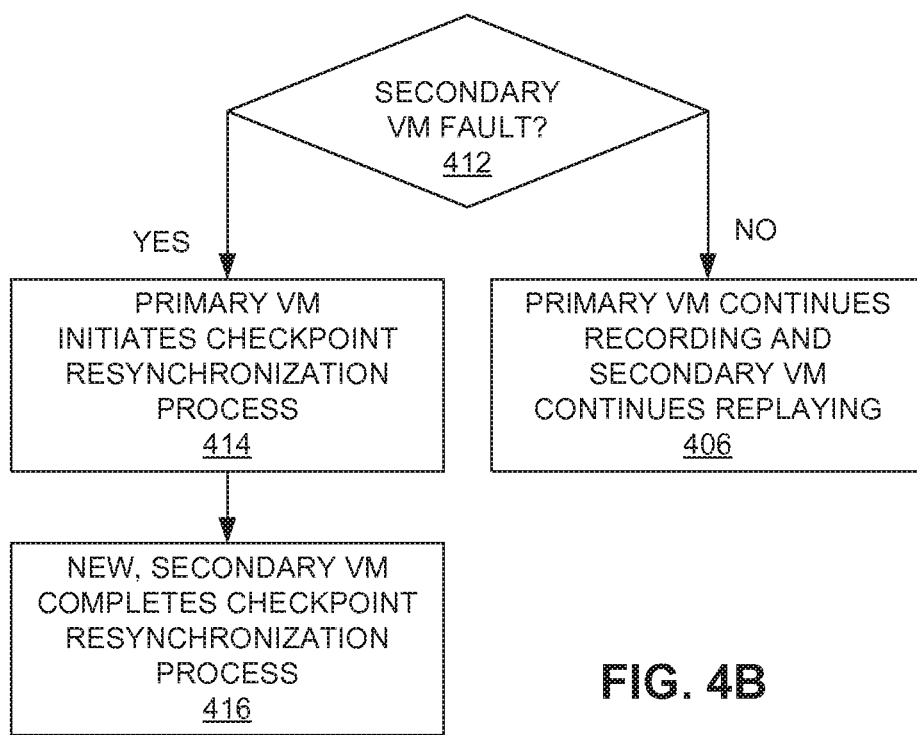
FIG. 4B shows a flowchart of a method of providing FT in case of a secondary VM fault in accordance with one or more embodiments of the present invention.

FIG. 4B shows a flowchart of a method of providing FT in case of a secondary VM fault in accordance with one or more embodiments of the present invention. At decision step 412 of FIG. 4B, the virtualization software in the secondary VCS determines whether secondary VM 200-2 fails. This determination may be done using any one of a number of heartbeating mechanisms that are well known to those of ordinary skill in the art. If so control is transferred to step 414, otherwise, control is transferred to step 406.

At step 414 of FIG. 4B, the virtualization software in the secondary VCS sends a message to the virtualization software in the primary VCS, and the virtualization software in the primary VCS causes primary VM 200-1 to initiate a checkpoint resynchronization process, and control is transferred to step 416. In addition, in accordance with one or more further such embodiments, primary VCS may initiate a checkpoint resynchronization process if it detects a failure of the secondary VCS using, for example, a heartbeat mechanism in accordance with any one of a number of methods that are well known to those of ordinary skill in the art.

At step 416 of FIG. 4B, the virtualization software in the secondary VCS starts a new secondary VM, and completes the checkpoint resynchronization process by restoring the checkpointed state of the primary VM 200-1 on the new secondary VM. After secondary VM 200-2 takes over, a new secondary VM can be created by resynchronization on a new host or on host 100-1 if that is still running or if it has been rebooted.

At step 406 of FIG. 4B, primary VM 200-1 continues operation and recording, and secondary VM 200-2 continues replaying the workload.

Checkpoint resynchronization of a primary VM with a secondary VM (refer to step 336 of FIG. 3B) can be a time-consuming operation if VM checkpointing is used. There are two ways to address this. One way is to reduce the cost of checkpoint resynchronization with various optimization techniques, and another way is to amortize the checkpoint resynchronization cost over a longer period of time by reducing occurrences of output divergence between primary and secondary VMs, thereby increasing the time between any required checkpoint resynchronization operations.

Reducing the Cost of Resynchronization

Figure 5:
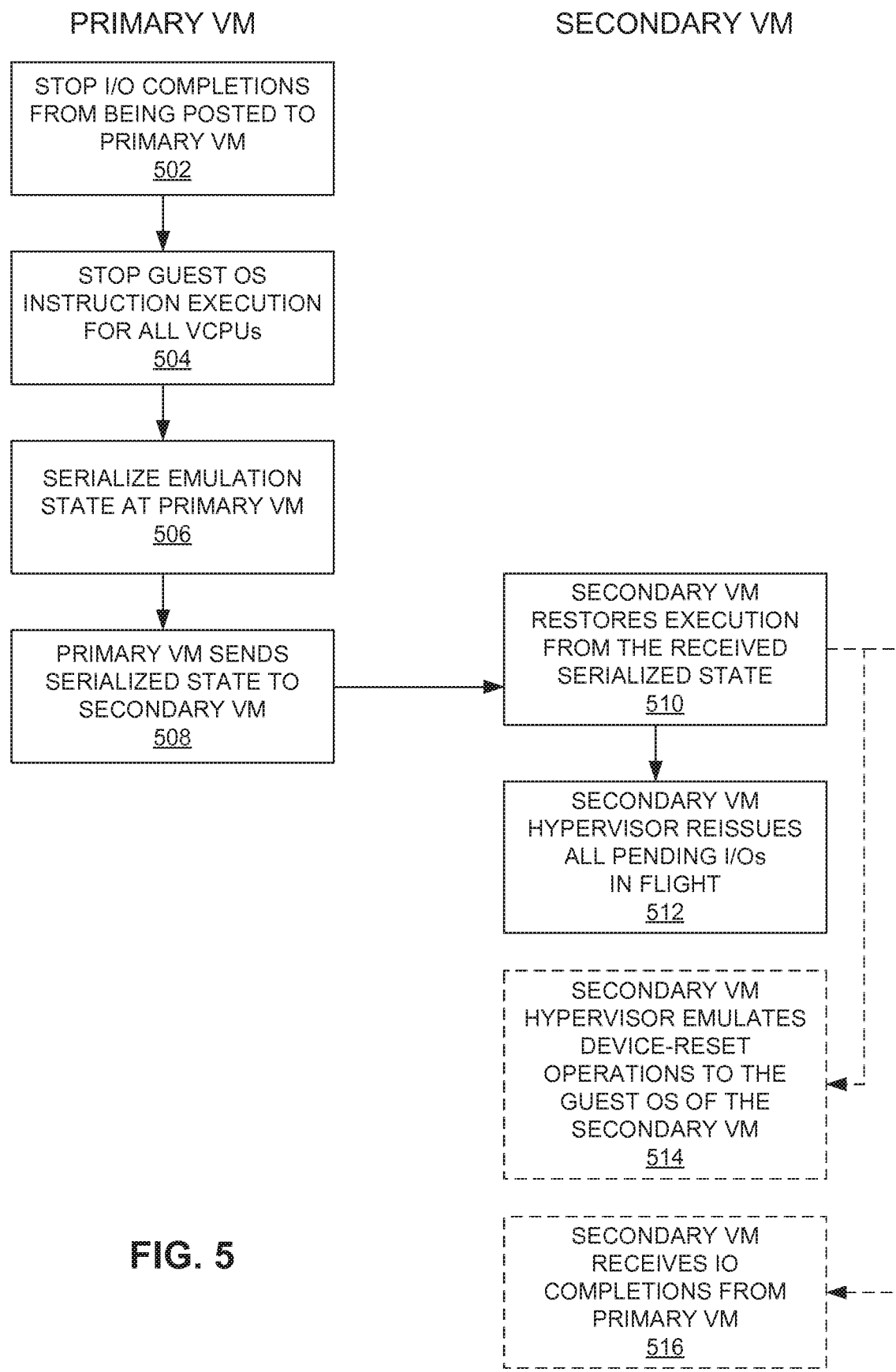
FIG. 5 shows a flowchart of a method of providing resynchronization of a primary VM and a secondary VM in accordance with one or more embodiments of the present invention.

FIG. 5 shows a flowchart of a method of resynchronizing a primary VM and a secondary VM in accordance with one or more embodiments of the present invention that reduce the cost of resynchronizing. The primary cost of resynchronization using checkpointing arises from quiescing outstanding I/Os to create a checkpoint, and from checkpointing memory. As set forth above, the purpose of checkpointing primary VM 200-1 (refer to step 336 of FIG. 3B) is not to restore the checkpoint at a later time but to resynchronize running secondary VM 200-2 built from identical sources. This may be taken advantage of as follows.

At step 502 of FIG. 5, virtualization software in the primary VCS stops posting I/O completions to primary VM 200-1. Control is then transferred to step 504.

At step 504 of FIG. 5, primary VM 200-1 stops guest OS instruction execution for all VCPUs. Control is then transferred to step 506.

At step 506 of FIG. 5, virtualization software in the primary VCS serializes and stores the emulation state of primary VM 200-1 in a serialized file (the pending I/Os representing the pending I/O state are included in the emulation state). Primary VM 200-1 then restarts guest OS instruction execution, and virtualization software in the primary VCS enables I/O completion posting—this avoids the need to quiesce outstanding I/O, and thereby, reduces the cost of resynchronization. Control is then transferred to step 508.

At step 508 of FIG. 5, virtualization software in the primary VCS sends the serialized file to the secondary VCS. Control is then transferred to step 510.

At step 510 of FIG. 5, virtualization software in the secondary VCS causes the secondary VM 200-2 to restore execution from the received serialized file containing the serialized emulation state of primary VM 200-1. Control is then transferred to step 512.

At step 512 of FIG. 5, at the virtualization software of the secondary VCS reissues all pending I/O in flight—this also avoids the need for quiescing outstanding I/O and thereby reduces the cost of resynchronization.

At step 514 of FIG. 5, a first alternative to reissuing pending I/O at step 512, is for the virtualization software, for example, the hypervisor, at secondary VM 200-2 to emulate device-reset operations to guest OS 220 of secondary VM 200-2 if a device (for example, a SCSI device) supports such operation. As a result, guest OS 220 of secondary VM 200-2 will then reissue the I/O itself.

At step 516 of FIG. 5, a second alternative to reissuing pending I/O at step 512, is for primary VM 200-1 to forward I/O completions as they occur to secondary VM 200-2. Such forwarding can be done over the same connection used to send log entries from the primary to the secondary VM (refer to FIG. 2).

The above-described step 506 of FIG. 5 of serializing the emulation state of primary VM 200-1 may further include optimizing the process of checkpointing memory. For example, one way to optimize checkpointing memory is to keep track of what memory has changed since the last resynchronization operation (for example, using dirty bits on shadow page tables for primary VM 200-1), and transmitting only changed memory pages to secondary VM 200-2 in step 508 of FIG. 5. In addition, a thread in the virtualization software of primary VM 200-1 can constantly scan the page tables of the virtual memory, and constantly transmit modified memory pages to secondary VM 200-2 (even prior to steps 506 and 508 of FIG. 5) in anticipation of an upcoming resynchronization of VMs 200-1 and 200-2. This requires more bandwidth, but reduces the latency of the resynchronization operation. Additionally, primary VM 200-1 can continue execution while transmitting a memory image to secondary VM 200-2 by write protecting all of its guest memory, and making copies of modified memory pages, thereby allowing the resynchronization process to preserve a consistent memory snapshot of primary VM 200-1.

Amortizing Resynchronization Cost Over Longer Period

The adverse impact of resynchronization on VM performance reduces as the time between externally visible I/O divergences increases. Therefore, one way to reduce resynchronization cost is to reduce the occurrence rate of output divergences that cause a resynchronization process to occur. The rate of output divergence can be reduced by reducing the rate of non-deterministic events in primary and secondary VMs 200-1 and 200-2. FIGS. 6A, 6B, 6C, 6D, 6E, 6F, 6G, and 6H show flowcharts of a variety of methods of reducing data and control flow divergence between a primary VM and a secondary VM in accordance with one or more embodiments of the present invention.

Best Effort Deterministic Replay

Figure 6A:
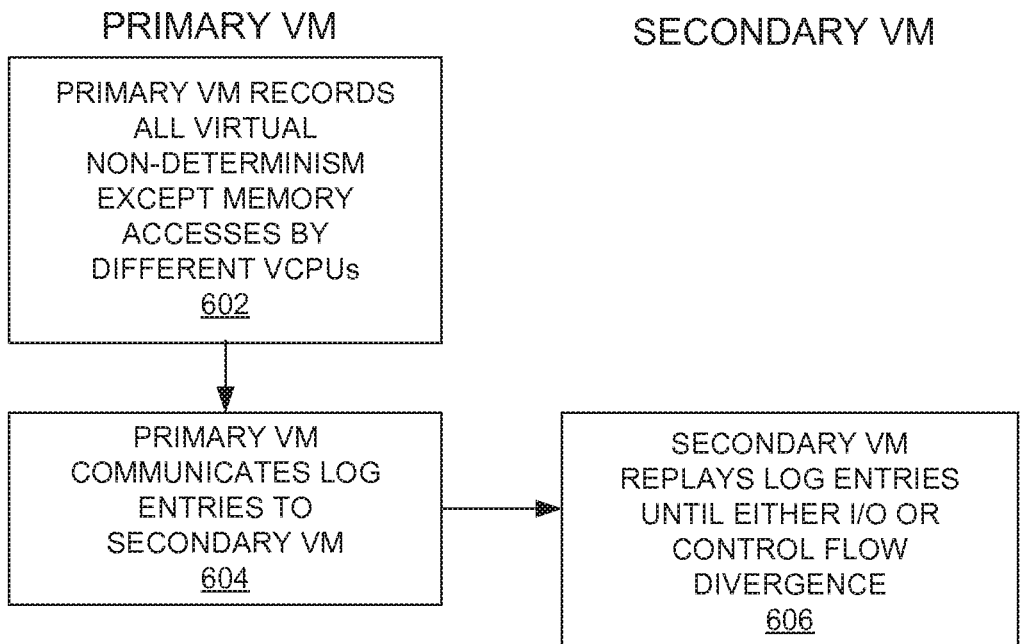
FIGS. 6A, 6B, 6C, 6D, 6E, 6F, 6G, and 6H show flowcharts of a variety of methods of reducing data and control flow divergence between a primary VM and a secondary VM in accordance with one or more embodiments of the present invention.

FIG. 6A shows a flowchart of one method of reducing data and control flow divergence between a primary VM and a secondary VM in accordance with one or more embodiments of the present invention. The method of FIG. 6A performs quasi-lockstep execution by logging and replaying all events which provide potential sources of non-determinism except memory accesses by different VCPUs. Specifically, at step 602 of FIG. 6A, the virtualization software in the primary VCS records all such events except memory access by different VCPUs, including all inputs at primary VM 200-1, and the primary VCS adds them to log entries 280. Control is then transferred to step 604.

At step 604 of FIG. 6A, the virtualization software in the primary VCS communicates log entries 280 to the secondary VCS. Control is then transferred to step 604.

At step 606 of FIG. 6A, secondary VM 200-2 continues to replay events from log entries 280 until either I/O or control flow (i.e., instruction sequences) diverges. Doing this can reduce the rate of output divergences because comparison of externally visible outputs still occurs to detect output divergence, but the comparison has a higher likelihood of success if potential memory divergence (that is not recorded and replayed) does not affect the outputs, i.e., the outputs do not depend on shared memory access ordering.

Replaying "Network Packets"

Figure 6B:
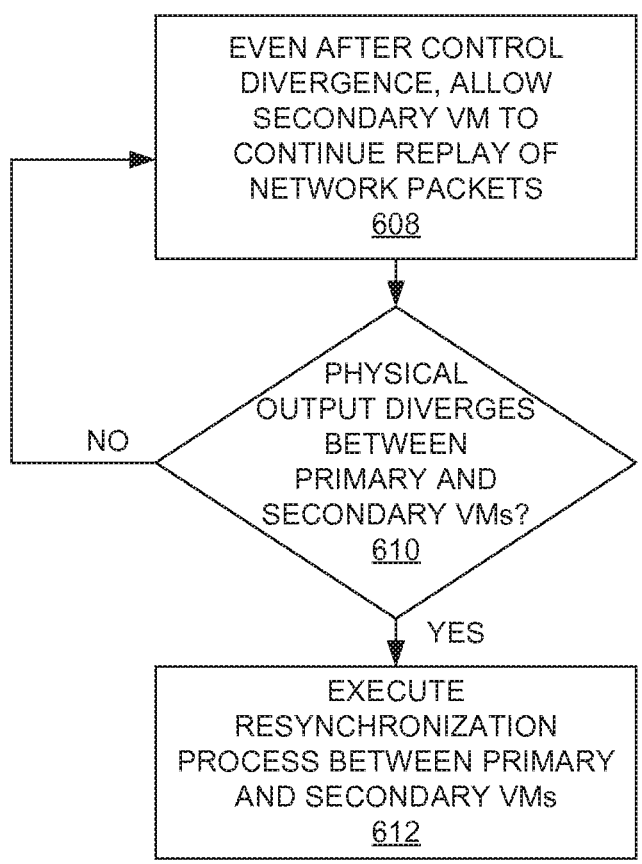

FIG. 6B shows a flowchart of another method of reducing the number of resynchronizations between a primary VM and a secondary VM in accordance with one or more further embodiments of the present invention. According to this method, at step 608 of FIG. 6B, the virtualization software in the second VCS allows secondary VM 200-2 to continue to replay network packets in log entries 280 received from primary VM 200-1 even after control divergence between primary and secondary VMs 200-1 and 200-2 is detected. Control is then transferred to decision step 610.

At decision step 610, the virtualization software in the secondary VCS determines whether the actual physical output network packets diverge between primary and secondary VMs 200-1 and 200-2. If they diverge, control is transferred to step 612, otherwise, control is transferred to step 610. For example, the virtualization software in the secondary VCS may allow secondary VM 200-2 to continue to replay network packets from log entries 280 while ignoring all other log entries (which are no longer valid, since the primary and secondary VMs are executing different instruction sequences). Given the same initial state of VMs 200-1 and 200-2, and the same input network packets, there is a high likelihood that VMs 200-1 and 200-2 will eventually produce the same physical output network packets, even with control divergence. Heuristics may be used to determine when to deliver such network packets from primary VM 200-1 to secondary VM 200-2. Thus, this is a case of determining when to deliver input network packets to secondary VM 200-2 for consumption when primary VM 200-1 knows that execution of secondary VM 200-2 has diverged from execution of primary VM 200-1 but that output packets are still matching. In this case, in accordance with one or more embodiments, primary VM 200-1 would try to deliver the input network packets to secondary VM 200-2 at about the same "virtual time" as they were delivered to primary VM 200-1. Here the term "virtual time" means the number of cycles that a VM has executed since it started. In other words, primary VM 200-1 delivers the input network packets to secondary VM 200-2 when secondary VM 200-2 has executed roughly the same number of cycles as when primary VM 200-1 received the packets. In accordance with one or more further embodiments, primary VM 200-1 delivers the input network packets to secondary VM 200-2 at roughly the same virtual time relative to its last output network packet (which, as set forth, are still the same between primary VM 200-1 and secondary VM 200-2 since the output network packets are still matching). In other words, primary VM 200-1 will deliver the input network packet to secondary VM 200-2 at the same virtual time since its last output network packet as the virtual time between the input network packet and its last output network packet in primary VM 200-1.

At step 612 of FIG. 6B, a resynchronization process is performed between primary VM 200-1 and secondary VM 200-2.

It should be appreciated that one or more further embodiments of the present invention apply the above-described method to all externally visible I/O.

Free Running of Secondary VM

Figure 6C:
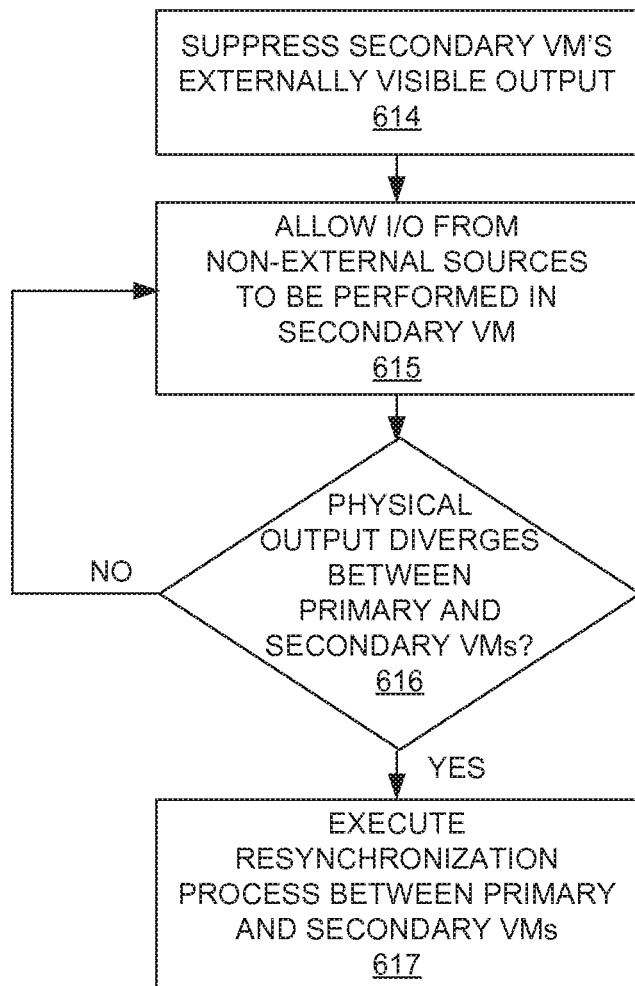

FIG. 6C shows a flowchart of still another method of reducing the number of resynchronizations between a primary VM and a secondary VM in accordance with one or more still further embodiments of the present invention. Even after packet delivery to secondary VM 200-2 becomes impossible because of failure of heuristics (for example, when control divergence makes it impossible to replay log entries or network packets in secondary VM 200-2), it is possible to allow secondary VM 200-2 to be in a "free running live" mode where externally visible output is suppressed, but I/O from non-external sources (for example, disk) is performed. At step 614 of FIG. 6C, in a free running live mode, the virtualization software in the secondary VCS suppresses externally visible outputs of secondary VM 200-2. Control is then transferred to step 615.

At step 615 of FIG. 6C, the virtualization software in the secondary VCS allows secondary VM 200-2 to perform output to non-external sources such as, for example and without limitation, a disk. Control is then transferred to decision step 616 of FIG. 6C.

At decision step 616 of FIG. 6C, it is determined whether the actual physical output network packets diverge between primary and secondary VMs 200-1 and 200-2. If they diverge, control is transferred to step 617, otherwise, control is transferred to step 615.

At step 617 of FIG. 6C, a resynchronization process between primary VM 200-1 and secondary VM 200-2 is performed. As mentioned above, for an embodiment in which a virtual disk is considered to be inside a VM (i.e., non-external), the virtual disks of primary and secondary VMs 200-1 and 200-2 can diverge. As such, the contents of the virtual disks must be resynchronized when performing a resynchronization of the VMs at a later time. However, in the free running live mode, it is still possible to compare the external I/O of the primary and secondary VMs 200-1 and 200-2, and to postpone resynchronization of the primary and secondary VMs 200-1 and 200-2 until an actual physical I/O network packet divergence occurs, i.e., the resynchronization process does not have to be eager on control/data divergence, instead, it can be postponed to an actual external I/O divergence.

Relaxing External I/O Comparison

Figure 6D:
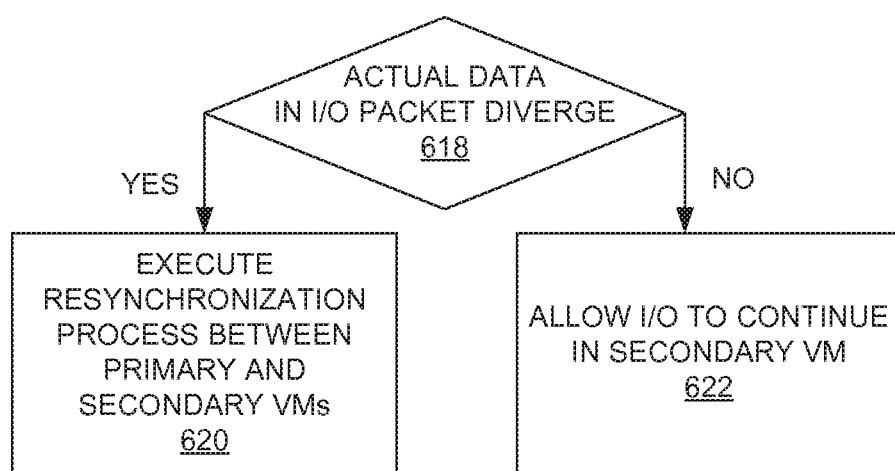

FIG. 6D shows a flowchart of still another method of reducing the number of resynchronizations between a primary VM and a secondary VM in accordance with one or more still further embodiments of the present invention. Some externally visible I/O divergence between primary and secondary VMs 200-1 and 200-2 can be tolerated. For example, in the case of physical output network packets, it is not necessary to have a perfect match on the entire packet between primary and secondary VMs 200-1 and 200-2. For example, in the case of TCP/IP (Transmission Control Protocol/Internet Protocol) packets, several fields in the TCP/IP packet can diverge as long as the actual payload data and certain other fields in the TCP/IP packet are the same between primary and secondary VMs 200-1 and 200-2. Thus, according to the method of FIG. 6D, at decision step 618, the virtualization software in the secondary VCS determines whether the actual payload data and certain other fields in the physical I/O packets diverge between primary and secondary VMs 200-1 and 200-2. If they diverge, control is transferred to step 620, otherwise, control is transferred to step 622.

At step 620 of FIG. 6D, a resynchronization process is performed between primary and secondary VMs 200-1 and 200-2.

At step 622 of FIG. 6D, the virtualization software in the secondary VCS allows secondary VM 200-2 to continue even if other fields in the physical I/O packets diverge between primary and secondary VMs 200-1 and 200-2, i.e., no resynchronization process is performed between primary and secondary VMs 200-1 and 200-2.

Control VCPU Scheduling

Figure 6E:
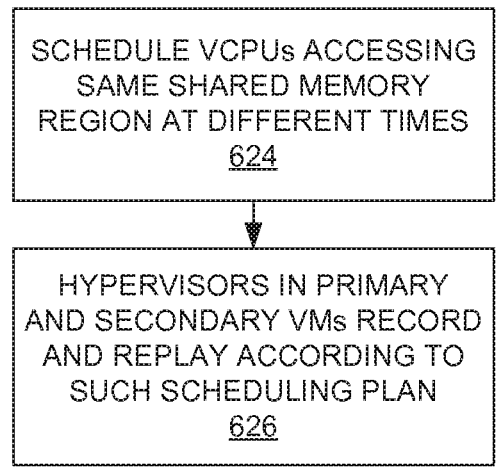

FIG. 6E shows a flowchart of still another method of minimizing data and control flow divergence between a primary VM and a secondary VM in accordance with one or more still further embodiments of the present invention. "Gang scheduling" is typically used to schedule VCPUs of primary and secondary VMs 200-1 and 200-2 on the primary and secondary VCS at the same time, thereby potentially reducing memory divergences due to different scheduling. However, if a VCS does not benefit from gang scheduling, and resynchronization of primary and secondary VMs 200-1 and 200-2 is frequently required due to frequent output divergence, then gang scheduling may be avoided in these circumstances and the opposite of gang scheduling may be used. Specifically, at step 624 of FIG. 6E, for example, two VCPUs of primary VM 200-1 are scheduled so that they access the same shared memory in different orders at different times. In other words, if the two VCPUs access the same shared memory region, they are scheduled at different times. Control is then transferred to step 626.

At step 626 of FIG. 6E, the virtualization software in the primary and secondary VCSs, respectively, can record and replay the shared memory access by the VCPUs according to the same scheduling plan.

Replay with Distributed Shared Memory

Figure 6F:
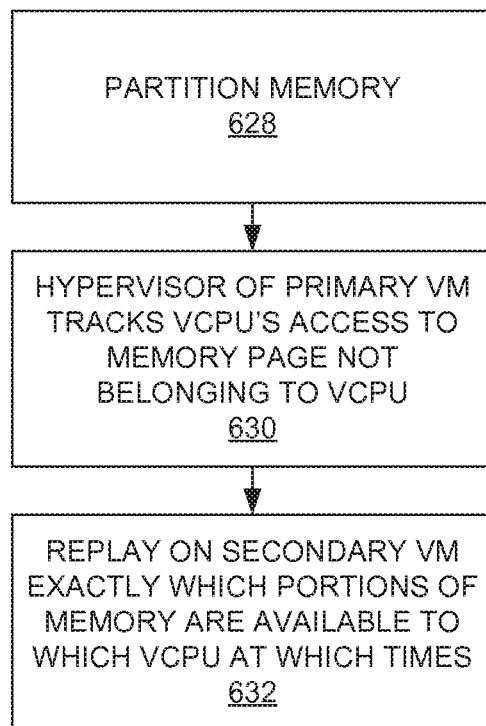

FIG. 6F shows a flowchart of still another method of minimizing data and control flow divergence between a primary VM and a secondary VM in accordance with one or more still further embodiments of the present invention. In accordance with this method, virtualization software preserves the execution order of atomic instructions on different VCPUs of a VM. Specifically, at step 628 of FIG. 6F, the virtualization software of the primary VCS partitions virtual memory of primary VM 200-1. Control is then transferred to step 630 of FIG. 6F.

At step 630 of FIG. 6F, the virtualization software (for example, hypervisor 600-1) of the primary VCS tracks a VCPU's access to a memory page not belonging to that VCPU. In accordance with one or more such embodiments, the virtualization software may use hardware page-protection or binary translation, or it may interpret guest instructions to track such accesses to the memory page not belonging to that VCPU. When using page-protection on hardware with local translation lookaside buffers (TLBs) per processor core, interprocessor interrupts are used to transfer ownership of memory pages between VCPUs. Control is then transferred to step 632.

At step 632 of FIG. 6F, the virtualization software of the secondary VCS causes secondary VM 200-2 to replay exactly which portions of the memory are available to which VCPU at which times, as tracked by the virtualization software of the primary VCS. By exactly reproducing which portions of memory are available to which VCPU at which times on secondary VM 200-2, memory races that may cause output divergence are prevented.

Replay with Shared Memory Read Values

Figure 6G:
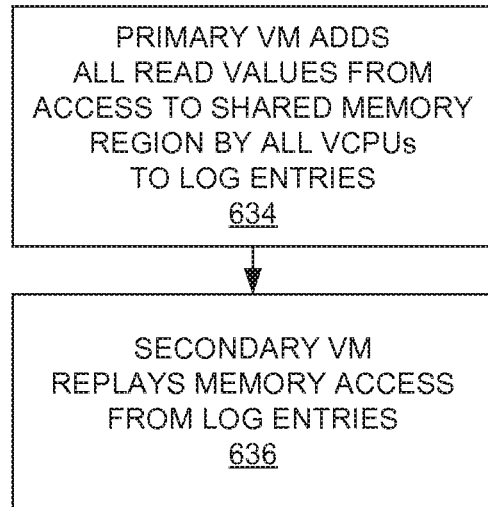

FIG. 6G shows a flowchart of still another method of minimizing data and control flow divergence between a primary VM and a secondary VM in accordance with still further embodiments of the present invention. At step 634 of FIG. 6G, the virtualization software of the primary VCS keeps track of each memory access to a shared memory region by all VCPUs. The virtualization software may use hardware page-protection or binary translation, or it may interpret guest instructions to track such accesses to the shared memory region. Then, the virtualization software of primary VCS adds all read values resulting from access to the shared memory region by all VPCUs to log entries 280. Control is then transferred to step 636.

At step 636 of FIG. 6G, the virtualization software in the secondary VCS causes secondary VM 200-2 to replay read values of the memory access from log entries 280. This reduces the occurrence of output divergence, since the read values in primary VM 200-1 are directly replayed by secondary VM 200-2.

Deterministic Replay of Lock Ordering

Figure 6H:
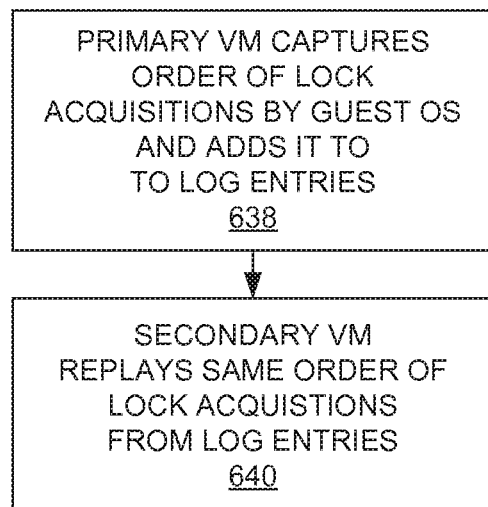

FIG. 6H shows a flowchart of still another method of minimizing data and control flow divergence between a primary VM and a secondary VM in accordance with still further embodiments of the present invention. Although the method described in conjunction with FIG. 6G may be beneficial in reducing the occurrences of output divergences, it may be slow in execution. According to the method of FIG. 6H, at step 638 of FIG. 6H, the virtualization software of the primary VCS captures the order of "lock" acquisitions by guest 0/S 220 and adds it to log entries 280. For example, in accordance with one or more embodiments of the present invention, lock acquisitions can be detected using a pattern matcher in a binary translator of the virtualization software or by using para-virtualization. Control is then transferred to step 640 of FIG. 6H.

At step 640 of FIG. 6H, the virtualization software in the secondary VCS causes the secondary VM 200-2 to replay the same order of lock acquisitions from log entries 280. Replaying the same order of lock acquisitions in secondary VM 200-2 during replay can be implemented using, for example, semaphores. As a result, synchronization race conditions can be eliminated and the frequency of data, control, and output divergences may be reduced.

Upon reading this disclosure, those of skill in the art will appreciate still additional alternative structural and functional designs for providing virtual machine fault tolerance through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

One or more embodiments of the present invention may be used to advantage in both a hosted and a non-hosted virtualized computer system, regardless of the degree of virtualization, in which the virtual machine(s) have any number of physical and/or logical virtualized processors. In addition, one or more embodiments of the present invention may also be implemented directly in a computer's primary operating system (OS), both where the OS is designed to support virtual machines and where it is not. Moreover, one or more embodiments of the present invention may be implemented wholly or partially in hardware, for example in processor architectures intended to provide hardware support for virtual machines. One or more embodiments of the present invention may be implemented as a computer program product including computer instructions configured to perform methods. The computer program can be stored on a computer readable storage medium to run, for example and without limitation, on one or more processors of a virtualized computer system.

Appendix Relating to Virtualized Computer Systems

As is well known in the field of computer science, a virtual machine (VM) is an abstraction—a "virtualization"—of an actual physical computer system. FIG. 1 shows one possible arrangement of computer system 700 that implements virtualization. As shown in FIG. 1, virtual machine (VM) or "guest" 200 is installed on a "host platform," or simply a "host," which includes: (a) system hardware, that is, system hardware 100 of computer system 700; and (b) one or more layers or co-resident components comprising system-level software, such as an operating system or similar kernel, or a virtual machine monitor or hypervisor (see below), or some combination of these. System hardware 100 typically includes one or more processors (for example, CPU(s) 110), memory (for example, MEM 130), some form of mass storage (for example, DISK 140), and various other devices (for example, DEVICES 170).

Each VM 200 will typically include virtual system hardware 201 and guest system software 202. The virtual system hardware typically includes at least one virtual CPU (for example, VCPU0 210-0 to VCPUm 210-$m$), virtual memory (for example, VMEM 230), at least one virtual disk (for example, VDISK 240), and one or more virtual device(s) (for example, VDEVICE(S) 270). Note that a disk—virtual or physical—is also a "device," but is usually considered separately because of the important role of the disk. All of the virtual hardware components of VM 200 may be implemented in software using known techniques to emulate corresponding physical components. Guest system software 202 includes guest operating system (OS) 220 and drivers 224 as needed for the various virtual devices.

Note that a single VM (for example, VM 200) may be configured with more than one virtualized processor, for example, FIG. 1, illustrates multiple virtual processors VCPU0 210-0, VCPU1 210-1, . . . , VCPUm 210-$m$. Embodiments described herein may be used regardless of the type of multi-threading—physical and/or logical—or the number of processors included in a VM.

The design and operation of virtual machines are well known.

Some interface is generally required between guest software within a VM (for example, VM 200) and various hardware components and devices in underlying system hardware 100. This interface—which may be referred to generally as "virtualization software"—may include one or more software components and/or layers, possibly including one or more software components known as "virtual machine monitors" (VMMs) (for example, VMM1, . . . , VMMn shown in FIG. 1), and "hypervisors," or virtualization "kernels" (for example, kernel 600 shown in FIG. 1).

Because virtualization terminology has evolved over time and has not yet become fully standardized, these terms do not always provide clear distinctions between software layers and the components to which they refer. For example, the term "hypervisor" is often used to describe both a VMM and a kernel (for example, VMM1 and kernel 600 shown in FIG. 1) together, either as separate but cooperating components or with one or more of VMM1, . . . , VMMn incorporated wholly or partially into kernel 600 itself; however, the term "hypervisor" is sometimes used instead to mean some variant of a virtual machine monitor alone, which interfaces with some other software layer(s) or component(s) to support the virtualization. Moreover, in some systems, some virtualization code is included in at least one "superior" VM to facilitate the operations of other VMs. Furthermore, specific software support for virtual machines may be included in a host OS itself. Unless otherwise indicated, embodiments of the present invention described above may be used in virtualized computer systems having any type or configuration of virtualization software.

FIG. 1 shows VMM1, . . . , VMMn as being separate entities from other components of the virtualization software. Although some software components used to implement one or more embodiments of the present invention are shown and described as being within a "virtualization layer" that is located logically between all virtual machines and the underlying hardware platform and/or system-level host software, this virtualization layer can be considered part of the overall virtualization software (although it would be possible to implement at least part of this layer in specialized hardware). Again, unless otherwise indicated or apparent from the description, it is to be assumed that one or more embodiments of the present invention can be implemented anywhere within the overall structure of the virtualization software, and even in systems that provide specific hardware support for virtualization.

Various virtualized hardware components in VM 200, such as virtual CPU(s) VCPU0 210-0, . . . , VCPUm 210-$m$, VMEM 230, VDISK 240, and VDEVICE(s) 270, are shown as being part of VM 200 for the sake of conceptual simplicity. In actuality, these "components" are usually implemented as device emulators 330 included in VMM1. In such an arrangement the VMM may (but need not) be set up to expose "generic" devices, which facilitates VM migration and hardware platform-independence.

Different systems may implement virtualization to different degrees-"virtualization" generally relates to a spectrum of definitions rather than to a bright line, and often reflects a design choice with respect to a trade-off between speed and efficiency on the one hand and isolation and universality on the other hand. The term "full virtualization" is sometimes used to denote a system in which no software components are included in the guest other than those that would be found in a non-virtualized computer; thus, guest OS 220 could be an off-the-shelf, commercially available OS with no components included specifically to support use in a virtualized environment. In contrast, the term "para-virtualization" is sometimes used to denote a system wherein the guest is configured to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, the term para-virtualization implies that guest OS 220 (in particular, its kernel) is specifically designed to support such an interface. According to this view, having, for example, an off-the-shelf version of Microsoft Windows XP as guest OS 220 would not be consistent with the term para-virtualization. Others define para-virtualization more broadly to include any guest OS 220 with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, embodiments of the present invention are not restricted to use in systems with any particular "degree" of virtualization and are not to be limited to any particular term of full or partial ("para-") virtualization.

In addition to the sometimes fuzzy distinction between full and partial (para-) virtualization, two arrangements of intermediate system-level software layer(s) are in general use — a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of VMM 300. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002). As illustrated in FIG. 1, in many cases, VMM1, . . . , VMMn are deployed on top of a software layer—kernel 600—constructed specifically to provide efficient support for VMs 200, . . . , 200-$n$. This configuration is frequently referred to as being "non-hosted." Kernel 600 may also handle other applications running on it that can be separately scheduled, as well as a console operating system that, in some architectures, is used to boot the system and facilitate certain user interactions with the virtualization software. Note that kernel 600 is not the same as a kernel within guest OS 220—as is well known, every operating system has its own kernel. Note also that kernel 600 is part of the "host" platform of the VM/VMM as defined above even though the configuration shown in FIG. 1 is commonly termed "non-hosted"; moreover, the kernel may be both part of the host and part of the virtualization software or "hypervisor." The difference in terminology is one of perspective and definitions that are still evolving in the art of virtualization.

What is claimed is:

1. A computer-implemented method for providing fault tolerance in virtualized computer systems, the method comprising:

executing a workload on a first guest and a second guest running on virtualization software that involves producing at least one externally visible output;

comparing an externally visible output of the second guest with an externally visible output of the first guest to determine if there is an output match;

pausing the first guest and subsequently executing a resynchronization of the second guest to restore a checkpointed state of the first guest on the second guest in response to a determination that the externally visible output of the second guest does not match the externally visible output of the first guest, the externally visible output of the first guest being kept from being output externally until completion of the resynchronization; and after the resynchronization of the second guest, outputting the externally visible output of the first guest and causing the paused first guest to resume operation from the checkpointed state, thereby the second guest providing quasi-lockstep fault tolerance for the first guest.

2. The method of claim 1, wherein each of the first and second guests is a virtualization of a physical computer system.

3. The method of claim 2, wherein each of the first and second guests is a virtual machine.

4. The method of claim 1, further comprising:
recording predetermined operations of the first guest to log entries and communicating the log entries to the second guest; and
replaying the log entries at the second guest to detect the output of the second guest to be compared with the output of the first guest.

5. The method of claim 1, wherein executing the resynchronization of the second guest comprises:
stopping I/O completions from being posted to the first guest and stopping guest operating system instructions from being executed at the first guest;
serializing an emulation state of the first guest in a serialized file; and
restoring execution of the first guest on the second guest based on the serialized state of the first guest stored in the serialized filed.

6. The method of claim 5, wherein executing the resynchronization of the second guest further comprises reissuing pending I/O operations at the second guest or forwarding I/O completions from the first guest to the second guest as the I/O completions occur.

7. The method of claim 1, further comprising reducing occurrences of the output of the second guest diverging from the output of the first guest, including:
recording virtual non-determinism of the first guest except memory access by different virtual processors of the first guest to log entries, for replay of the log entries by the second guest.

8. The method of claim 1, further comprising reducing occurrences of the output of the second guest diverging from the output of the first guest, including:
allowing the second guest to continue replay of log entries from the first guest even after control divergence in network packets between the first and second guests, until a physical output packet diverges between the first guest and the second guest.

9. The method of claim 1, further comprising reducing occurrences of the output of the second guest diverging from the output of the first guest, including:
suppressing the output from the second guest; and
allowing I/O operation from non-external sources to be performed at the second guest, until physical outputs divergence between the first guest and the second guest.

10. The method of claim 1, further comprising reducing occurrences of the output of the second guest diverging from the output of the first guest, including:
allowing I/O operations to continue in the second guest even if I/O packets diverge between the first guest and the second guest, until actual payload data in the I/O packets diverge between the first guest and the second guest.

11. The method of claim 1, further comprising reducing occurrences of the output of the second guest diverging from the output of the first guest, including:
scheduling virtual processors of the first guest accessing a shared memory region at different times, for replay of log entries, including a scheduling plan of the virtual processors by the second guest.

12. The method of claim 1, further comprising reducing occurrences of the output of the second guest diverging from the output of the first guest, including:
tracking access by a virtual processor of the first guest to a memory page not belonging to the virtual processor, for replay of log entries including the tracked access by the second guest.

13. The method of claim 1, further comprising reducing occurrences of the output of the second guest diverging from the output of the first guest, including:
adding read values from access to a shared memory region by virtual processors not corresponding to the first guest to log entries, for replay of the read values at the second guest based on the log entries.

14. The method of claim 1, further comprising reducing occurrences of the output of the second guest diverging from the output of the first guest, including:
adding an order of lock acquisition by a guest operating system of the first guest to log entries, for replay of the order of lock acquisitions at the second guest based on the log entries.

15. A non-transitory computer-readable storage medium containing program instructions for method for providing fault tolerance in virtualized computer systems, wherein execution of the program instructions by one or more processors of a computer system causes the one or more processors to perform steps comprising:
executing a workload on a first guest and a second guest running on virtualization software that involves producing at least one externally visible output;
comparing an externally visible output of the second guest with an externally visible output of the first guest to determine if there is an output match;
pausing the first guest and subsequently executing a resynchronization of the second guest to restore a checkpointed state of the first guest on the second guest in response to a determination that the externally visible output of the second guest does not match the externally visible output of the first guest, the externally visible output of the first guest being kept from being output externally until completion of the resynchronization; and
after the resynchronization of the second guest, outputting the externally visible output of the first guest and causing the paused first guest to resume operation from the checkpointed state, thereby the second guest providing quasi-lockstep fault tolerance for the first guest.

16. The non-transitory computer-readable storage medium of claim 15, wherein each of the first and second guests is a virtualization of a physical computer system.

17. The non-transitory computer-readable storage medium of claim 15, wherein the steps further comprise:
recording predetermined operations of the first guest to log entries and communicating the log entries to the second guest; and
replaying the log entries at the second guest to detect the output of the second guest to be compared with the output of the first guest.

18. The non-transitory computer-readable storage medium of claim 15, wherein executing the resynchronization of the second guest comprises:
stopping I/O completions from being posted to the first guest and stopping guest operating system instructions from being executed at the first guest;

serializing an emulation state of the first guest in a serialized file; and restoring execution of the first guest on the second guest based on the serialized state of the first guest stored in the serialized filed.

19. A computer system comprising:

memory; and at least one processor configured to:

execute a workload on a first guest and a second guest running on virtualization software that involves producing at least one externally visible output;

compare an externally visible output of the second guest with an externally visible output of the first guest to determine if there is an output match;

pause the first guest and subsequently executing a resynchronization of the second guest to restore a checkpointed state of the first guest on the second guest in response to a determination that the externally visible output of the second guest does not match the externally visible output of the first guest, the externally visible output of the first guest being kept from being output externally until completion of the resynchronization; and after the resynchronization of the second guest, outputting the externally visible output of the first guest and cause the paused first guest to resume operation from the checkpointed state, thereby the second guest providing quasi-lockstep fault tolerance for the first guest.

20. The computer system of claim 19, wherein the at least one processor is further configured to:

stop I/O completions from being posted to the first guest and stop guest operating system instructions from being executed at the first guest;

serialize an emulation state of the first guest in a serialized file; and restore execution of the first guest on the second guest based on the serialized state of the first guest stored in the serialized filed.

* * * * *